(12) United States Patent
Groll

(10) Patent No.: US 10,259,627 B2
(45) Date of Patent: Apr. 16, 2019

(54) FASTENING SYSTEM

(71) Applicant: Marking Services Incorporated, Milwaukee, WI (US)

(72) Inventor: Michael Groll, Port Washington, WI (US)

(73) Assignee: Marking Services Incorporated, Milwaukee, WI (US)

( * ) Notice: Subject to any disclaimer, the term of this patent is extended or adjusted under 35 U.S.C. 154(b) by 84 days.

(21) Appl. No.: 15/592,959

(22) Filed: May 11, 2017

(65) Prior Publication Data

US 2018/0327155 A1 Nov. 15, 2018

(51) Int. Cl.
| | | |
|---|---|---|
| *B65D 63/00* | (2006.01) | |
| *F16B 2/08* | (2006.01) | |
| *B65D 63/14* | (2006.01) | |
| *F16L 3/137* | (2006.01) | |
| *G09F 3/20* | (2006.01) | |

(52) U.S. Cl.
CPC ............. *B65D 63/00* (2013.01); *B65D 63/14* (2013.01); *F16B 2/08* (2013.01); *F16L 3/137* (2013.01); *G09F 3/205* (2013.01); *B65D 2563/00* (2013.01)

(58) Field of Classification Search
CPC ............... Y10T 24/1498; B65D 63/00; B65D 63/1018; B65D 63/1027; B65D 2563/101; B65D 2563/103; B65D 2563/108; F16B 2/08; F16L 3/2332; F16L 3/2336; F16L 3/2338
See application file for complete search history.

(56) References Cited

U.S. PATENT DOCUMENTS

| | | | |
|---|---|---|---|
| 4,537,432 A | 8/1985 | Meeks | |
| 5,224,244 A | 7/1993 | Ikeda et al. | |
| 5,836,053 A | 11/1998 | Davignon et al. | |
| 6,119,314 A | 9/2000 | Freed | |
| 6,938,305 B2 * | 9/2005 | Garver | B65D 63/1081 24/16 PB |
| 8,037,579 B2 | 10/2011 | Tomasetti | |
| 8,978,210 B2 | 3/2015 | Arjomand | |
| 9,021,665 B2 | 5/2015 | Chen | |
| 2016/0009469 A1 | 1/2016 | Schneider de Oliveira et al. | |

FOREIGN PATENT DOCUMENTS

| | | |
|---|---|---|
| DE | 4128763 A1 | 3/1992 |
| EP | 2530028 A1 | 12/2012 |
| JP | S5634182 U | 4/1981 |

OTHER PUBLICATIONS

International Search Report and Written Opinion for Application No. PCT/US2018/029261 dated Jul. 10, 2018 (15 pages).

* cited by examiner

*Primary Examiner* — Robert Sandy
(74) *Attorney, Agent, or Firm* — Michael Best & Friedrich LLP

(57) ABSTRACT

A fastening system includes a ratchet head and a strap having a pair of side edges, a first side defining a base surface, and a second side having a plurality of teeth. A pair of troughs extend in a longitudinal direction and each is positioned interstitially between the plurality of teeth and a side edge. A plurality of standoffs are provided on the second side of the strap along each of the side edges, the standoffs extending from the base surface at least as far as a distal extent of the plurality of teeth. The ratchet head has a ratchet pawl operable to engage the plurality of teeth to adjustably receive and secure the strap.

19 Claims, 5 Drawing Sheets

150
FASTENING SYSTEM

BACKGROUND

This disclosure relates to fastening systems using straps with teeth that engage a ratchet head. Such fastening systems are most often referred to as cable ties or "zip ties". The majority of such fastening systems are designed to provide a single component where one distal end forms the tip of the strap that is inserted into an aperture of the ratchet head provided at the opposite distal end, thus forming a loop that can be adjustably tightened through the ratcheting mechanism. Such fastening systems can be quickly, easily, and inexpensively provided for a number of fastening tasks. Although various adaptations of the basic cable tie system have been realized throughout the prior art, the existing systems do not satisfactorily meet all the needs of certain specialized uses, including those where a fastener much cinch around a structure such as a pipe and be exposed to adverse environmental conditions.

SUMMARY

In one aspect, the invention provides a fastening system including a strap. The strap includes a first side defining a base surface and a second side opposite the first side having a plurality of teeth arranged along a longitudinal direction of the strap. A pair of opposed lateral side edges of the strap extend in the longitudinal direction. The strap further includes a pair of troughs, each of the pair of troughs extending in the longitudinal direction and positioned interstitially between the plurality of teeth and a respective one of the pair of opposed lateral side edges. A plurality of standoffs are provided on the second side of the strap along each of the pair of opposed lateral side edges. The plurality of standoffs extend from the base surface at least as far as a distal extent of the plurality of teeth. The fastening system includes a ratchet head having a ratchet pawl operable to engage the plurality of teeth to adjustably receive and secure the strap.

In another aspect, the invention provides a fastening system including a strap. The strap includes a first side defining a base surface and a second side opposite the first side having a plurality of teeth arranged along a longitudinal direction of the strap. A pair of opposed lateral side edges of the strap extend in the longitudinal direction. A plurality of standoffs are provided on the second side of the strap along each of the pair of opposed lateral side edges. The plurality of standoffs extend from the base surface at least as far as a distal extent of the plurality of teeth. The fastening system includes a ratchet head having a first inlet opening provided in a first end and sized to receive the strap, and a second inlet opening provided in a second end opposite the first end and sized to receive the strap. A first ratchet pawl is provided inward of the first inlet aperture, and a second ratchet pawl is provided inward of the second inlet opening. The plurality of teeth and the plurality of standoffs are arranged on the interior of a loop formed by the strap when engaged with the first and second ratchet pawls of the ratchet head so that distal tips of the plurality of standoffs define the innermost points of the loop, and a continuous longitudinally-extending surface is avoided.

BRIEF DESCRIPTION OF THE DRAWINGS

FIG. 1A is a detail view of the strap of FIG. 1.

DETAILED DESCRIPTION

Figure 1:
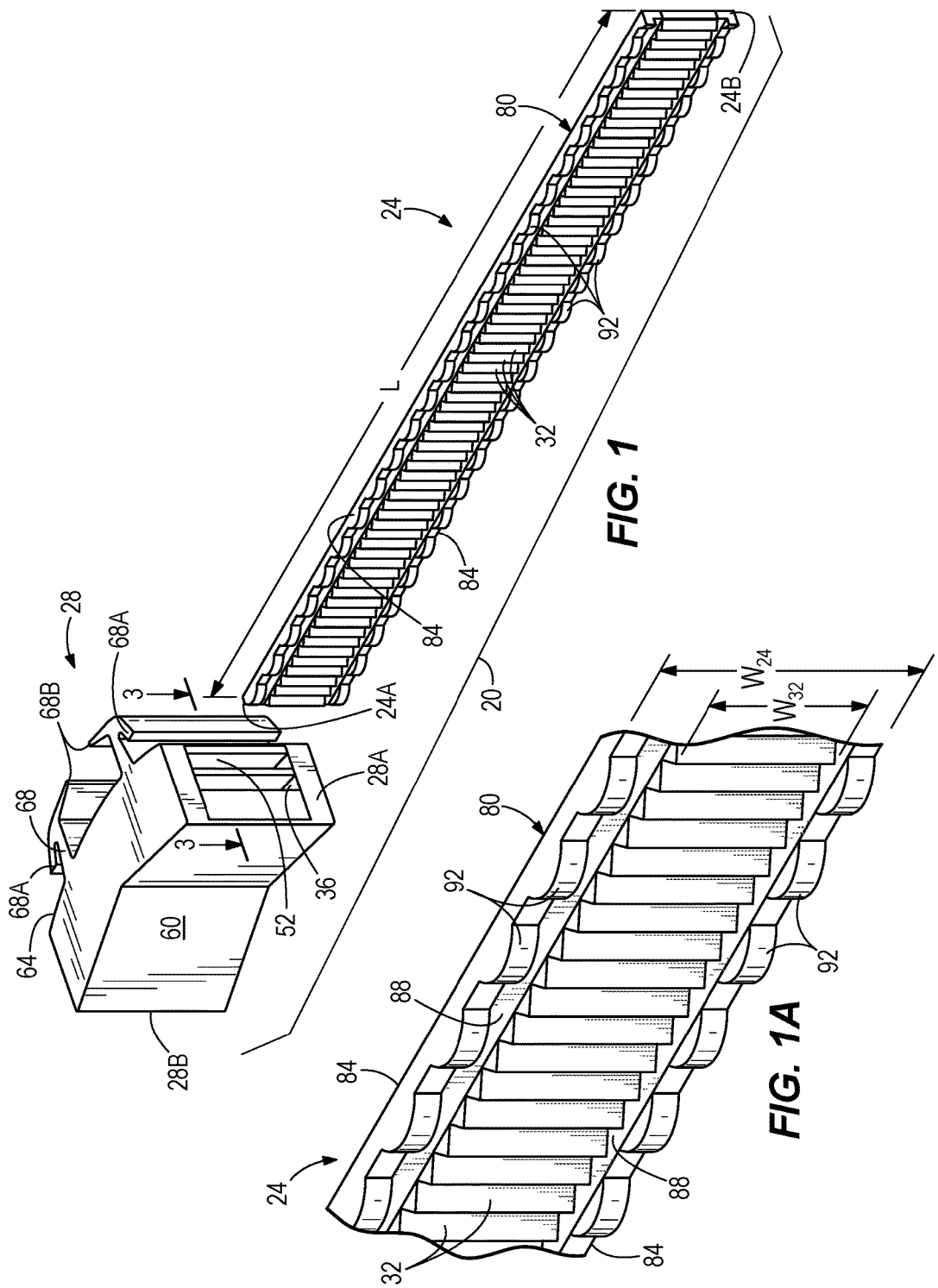
FIG. 1 is a first perspective view of a fastening system, including a strap and a ratchet head, as described in the present disclosure.
Figure 2:
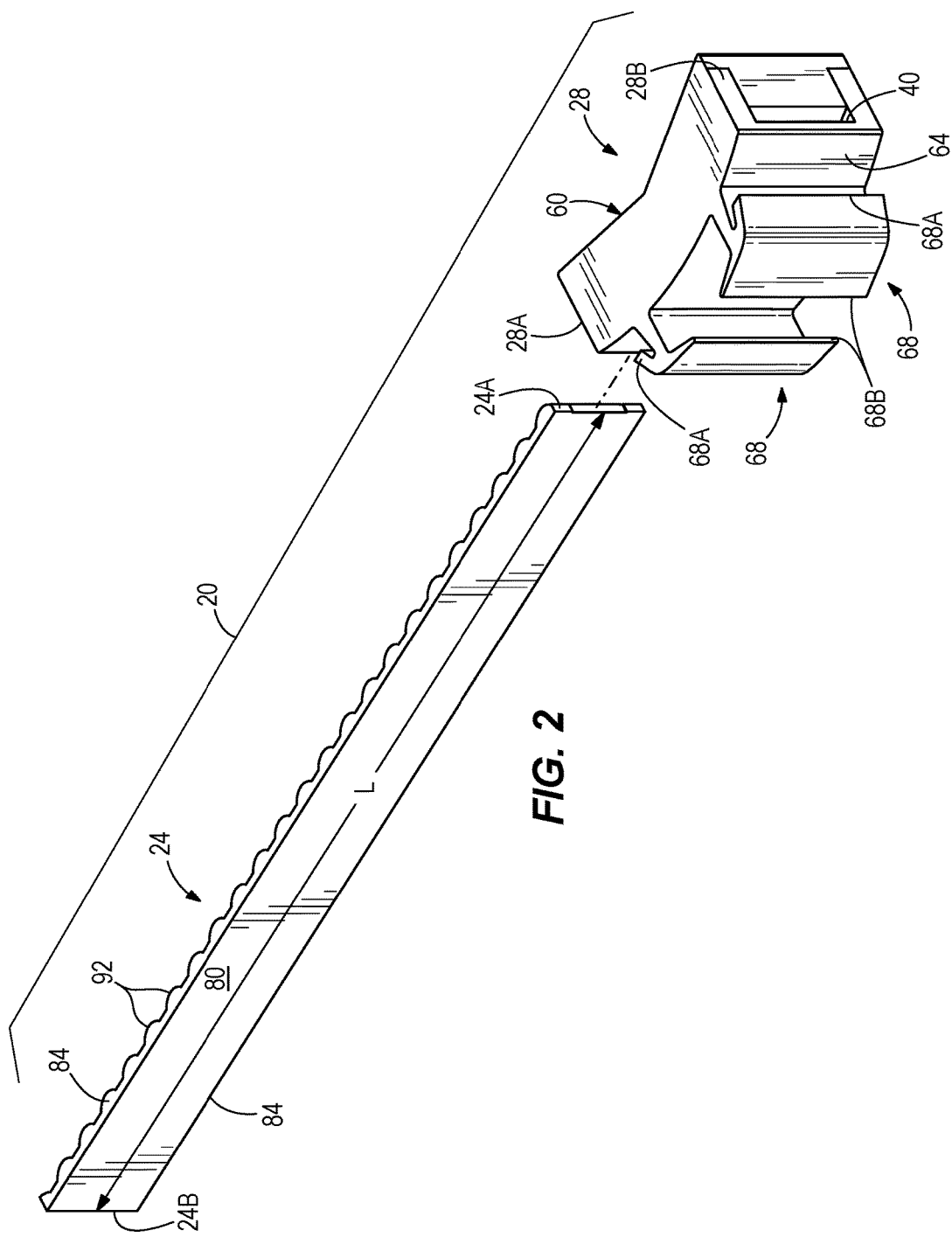
FIG. 2 is a second perspective view of the fastening system of FIG. 1.

FIGS. 1 and 2 illustrate a fastening system 20. The fastening system 20 is a multi-piece fastening system as shown including two separate components, namely a strap 24 and a ratchet head 28 operable to receive and secure the strap 24. The strap 24 extends along a length L defining a lengthwise or longitudinal direction, and the strap 24 is insertable into the ratchet head 28 in the longitudinal direction. Though shown with the discrete final length L, the strap 24 is provided in some constructions as part of a continuous roll of material that is cut to length as needed on site during fastening. This allows the strap material to easily adapt to a variety of differently-sized structures being fastened or wrapped. A conventional cable tie tightening and cut-off tool may be used for tightening and cutting the strap material for installation of the fastening system 20. As discussed in further detail below, the strap 24 includes a plurality of teeth 32 arranged along the longitudinal direction. As shown in FIG. 1, the ratchet head 28 includes a first inlet opening 36 formed in a first end 28A of the ratchet head 28, and the first inlet opening 36 is dimensioned to receive a first end 24A of the strap 24 as inserted along arrow A. As shown in FIG. 2 and the cross-section of FIG. 3, the ratchet head 28 further includes a second inlet opening 40 formed in a second end 28B of the ratchet head 28. The second inlet opening 40 is dimensioned to receive a second end 24B of the strap 24 as inserted along arrow B.

Figure 3:
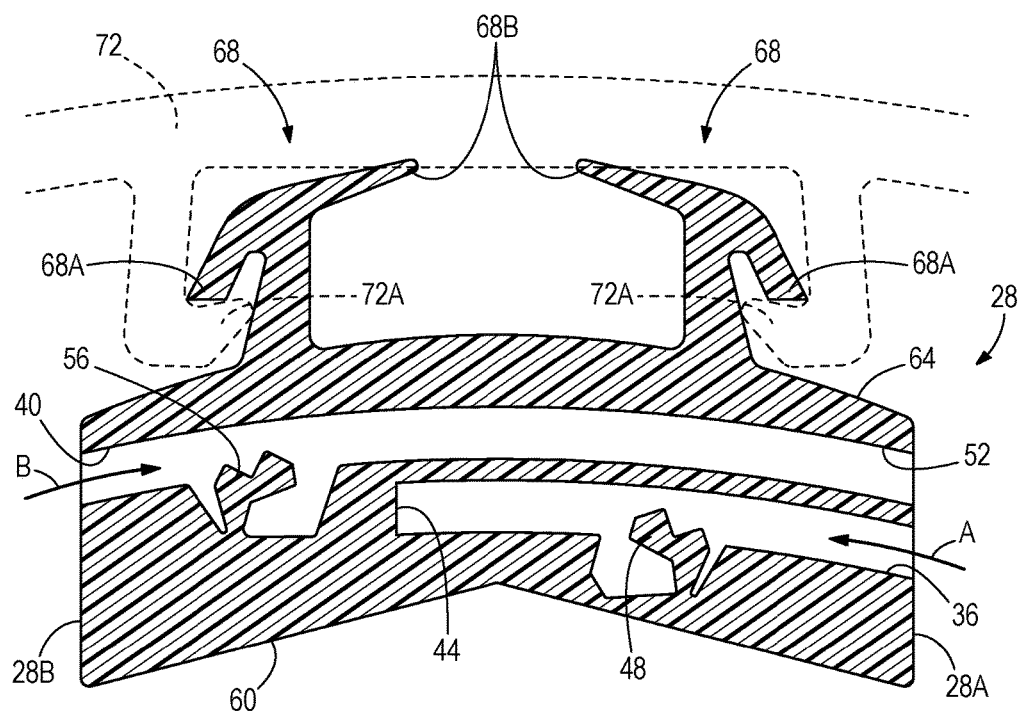
FIG. 3 is a cross-section view of the ratchet head, taken along line 3-3 of FIG. 1.

With further reference to the ratchet head cross-section of FIG. 3, it is illustrated that the first inlet opening 36 extends into the ratchet head 28 (e.g., more than half-way between the first end 28A and the second end 28B) and terminates therein at an end wall 44, forming a blind recess. In between the first inlet opening 36 and the end wall 44, the ratchet head 28 includes a first ratchet pawl 48. The first ratchet pawl 48 can be flexible or hinged and is operable to allow passage of the strap 24 from the first inlet opening 36 toward the end wall 44 along arrow A, and to inhibit or prevent retraction of the strap 24 in a direction opposite arrow A by way of engagement of the first ratchet pawl 48 with the teeth 32 of the strap 24. Thus, insertion of the first end 24A of the strap 24 into the first inlet opening 36 and past the first ratchet pawl 48 can fixedly secure the strap 24 and the ratchet head 28 together for further handling and use. Unlike the first inlet opening 36, the second inlet opening 40 extends into the ratchet head 28 to form a passage through the ratchet head 28 to an outlet opening 52 on the first end 28A, adjacent the first inlet opening 36. Along the passage, between the second inlet opening 40 and the outlet opening 52, a second ratchet pawl 56 is provided. The second ratchet pawl 56, similar to the first ratchet pawl 48, can be flexible or hinged to allow one-way passage of the strap 24. In particular, the second ratchet pawl 56 is operable to allow passage of the strap 24 (i.e., the second end 24B) from the second inlet opening 40 along arrow B, and to inhibit or prevent retraction of the strap 24 in a direction opposite arrow B by way of engagement of the second ratchet pawl 56 with the teeth 32 of the strap 24. In a condition where the first strap end 24A is already secured with the ratchet head 28 by the first ratchet pawl 48, insertion of the second strap end 24B past the second ratchet pawl 56 allows the fastening system 20 to form a loop that can be adjustably cinched around one or more objects. The ratchet pawls 48, 56 are arranged in the ratchet head 28 so that the plurality of teeth 32 are arranged on the interior of the loop formed by the strap 24.

Extending between the first and second ends 28A, 28B, the ratchet head 28 includes an interior or bottom side 60 and an exterior or top side 64. The bottom side 60 can be concave as shown, formed by flat surface segments or one or more curved surfaces. Alternately, the bottom side 60 can be flat or even convex. However, forming the bottom side 60 to be concave allows the ratchet head 28 to be placed onto and at least partially conform to an object or objects having or forming a convex outer profile, one example of which is discussed in further detail below with reference to FIGS. 6 and 7. The top side 64 of the ratchet head 28 can include a mount, which is formed in the illustrated construction by a pair of opposed mount members 68, but in other constructions is formed by at least one mount member. Each mount member 68 can include a latch member 68A configured for engaging and securely latching with a complementary latch member 72A formed on a carrier 72 as shown in dashed lines in FIG. 3. As shown, the latch members 68A can together form a male portion of a latch insertable and retainable in a female portion of a latch as formed between the latch members 72A of the carrier 72. In other constructions, the male-female relationship is reversed. Each mount member 68 of the ratchet head 28 can further include a resilient spring tab 68B. The resilient spring tabs 68B are dimensioned to provide interference with the carrier 72 when the respective latch members 68A, 72A are latched together so that the spring tabs 68B are elastically deflected. Thus, the spring tabs 68B provide a bias or preload force between the ratchet head 28 and the carrier 72.

Figure 4:
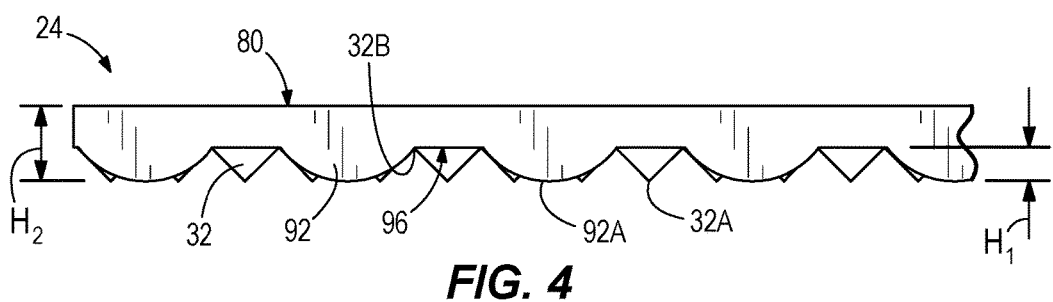
FIG. 4 is a side view of the strap of FIG. 1.
Figure 5:
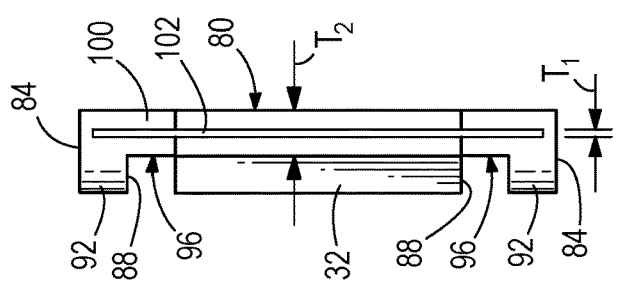
FIG. 5 is an end view of the strap of FIG. 1.

Features of the strap 24 are described in further detail with specific reference to FIGS. 4 and 5. The strap 24 includes a first side defining a base surface 80. A second side of the strap 24 opposite the base surface 80 is provided with the plurality of teeth 32. As shown in FIG. 4, the teeth 32 can be symmetrical with respect to the first and second strap ends 24A, 24B so that the strap 24 is bi-directionally engageable with the ratchet head 28, not requiring an exact one of the strap ends 24A, 24B to be inserted into the ratchet head 28 to operate with the ratchet pawls 48, 56. Along the length L of the strap 24 between the first and second ends 24A, 24B, the strap 24 includes a pair of opposed lateral side edges 84 extending in the longitudinal direction. As shown clearly in FIG. 5, the teeth 32 are disposed centrally on strap 24 in a widthwise direction transverse to the longitudinal direction. However, the teeth 32 do not extend fully across a width $W_{24}$ of the strap 24 between the opposed lateral side edges 84. Rather, the teeth 32 extend a width $W_{32}$ that is less than the strap width $W_{24}$. On the second side of the strap 24, opposite the base surface 80, a pair of channels or troughs 88 are defined such that each one of the pair of troughs 88 is positioned interstitially between the teeth 32 and a respective one of the pair of opposed lateral side edges 84. Each of the troughs 88 extends in the longitudinal direction along the entire length L between the first and second strap ends 24A, 24B. Thus, in the widthwise direction, each trough 88 is bordered by the teeth 32 to a central or medial side and by the respective lateral side edge 84 to a lateral side.

Along each lateral side edge 84, a plurality of projections or standoffs 92 are provided on the second side of the strap 24 so that the standoffs 92 project in the same direction as the teeth 32. In other words, the standoffs 92 face to the interior of the loop formed by the strap 24 when engaged with the ratchet head 28. As illustrated, adjacent standoffs 92 can be spaced apart in the longitudinal direction. Along each lateral side edge 84, the standoffs 92 can form an interrupted upstanding flange on the strap 24. Similar to the teeth 32, the standoffs 92 can be symmetrical so that the strap 24 is not directionally unique with respect to the first and second strap ends 24A, 24B. A trough base surface 96 of each trough 88 can extend all the way to the respective lateral side edge 84 in the spaces between adjacent standoffs 92. Each of the plurality of standoffs 92 extends from the trough base surface 96 at least as far as a distal extent, or tips 32A, of the teeth 32. In the illustrated construction, distal ends, or tips 92A, of the standoffs 92 extend from the trough base surface 96 the same height $H_1$ as the tips 32A of the teeth 32. As such, the tooth tips 32A and standoff tips 92A also extend equal heights $H_2$ from the strap base surface 80. Roots 32B formed between each two adjacent teeth 32 can be at the same height as the trough base surface 96. As shown in FIG. 4, the tips 92A of the standoffs 92 can be offset in the longitudinal direction from the tips 32A of the teeth 32. Although the standoffs 92 can take various shapes, each standoff 92 tapers toward the distal tip 92A. The illustrated standoffs 92 have a shape formed as a segment of a cylinder such that the distal ends 92 are formed by the furthest extent of an arcuate surface as viewed along the widthwise direction as in FIG. 4. As such, the trough base surface 96 and the roots 32B of the teeth 32 are spaced away from an object surface even when the strap 24 is wrapped tightly around the object surface.

In some constructions, the strap 24 can be manufactured by extrusion. In particular, the strap 24 may be co-extruded of two materials in a co-extrusion process. The co-extruded strap 24 can include a thermoplastic body 100 over a metal (e.g., steel) core 102 as shown in FIG. 5. The core 102 of the strap 24 can be stainless steel. In some constructions, the core 102 can be formed as a flat strip or sheet having a material thickness $T_1$ between 0.015 in. and 0.025 in., such as 0.020 in, and the body 100 of the strap 24 surrounding the core 102 can have a material thickness $T_2$ between 0.187 in. and 0.313 in., such as 0.250 in. In other constructions, the strap 24 can be manufactured, by extrusion or otherwise, as a single uniform material without a separate core.

Figure 6:
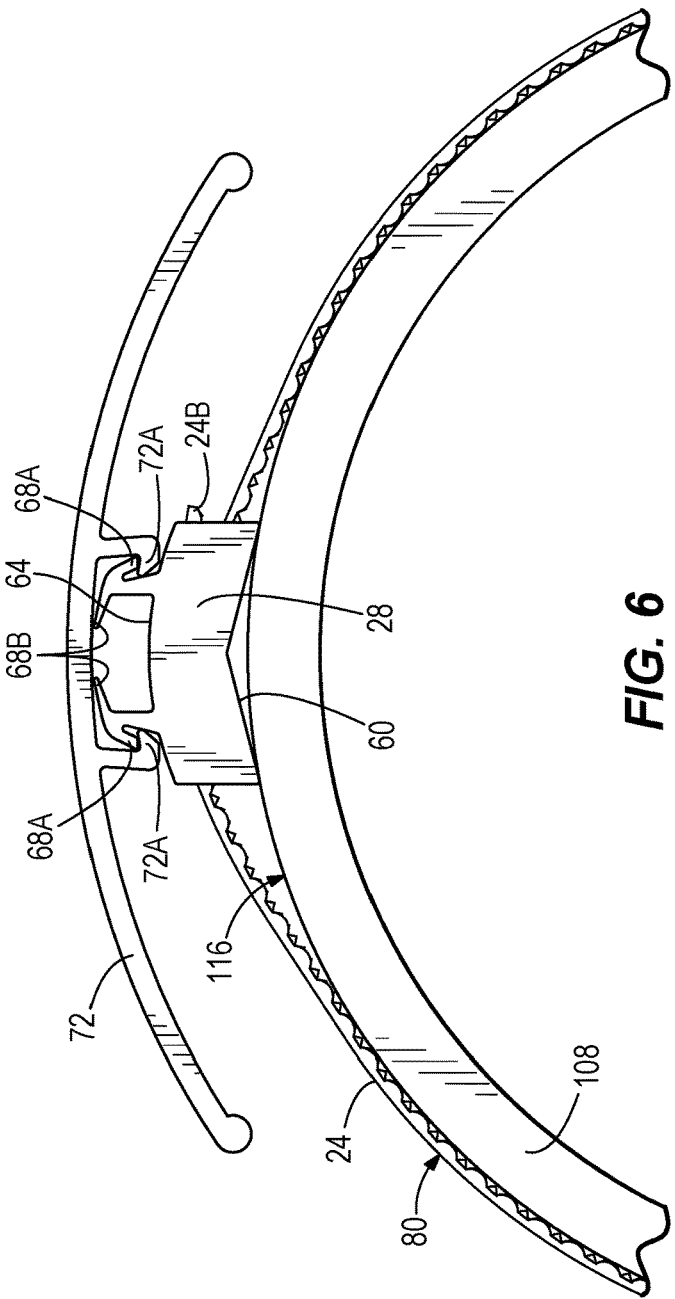
FIG. 6 is an end view of the fastening system of FIG. 1 secured to a pipe and supporting a carrier having identifying indicia.
Figure 7:
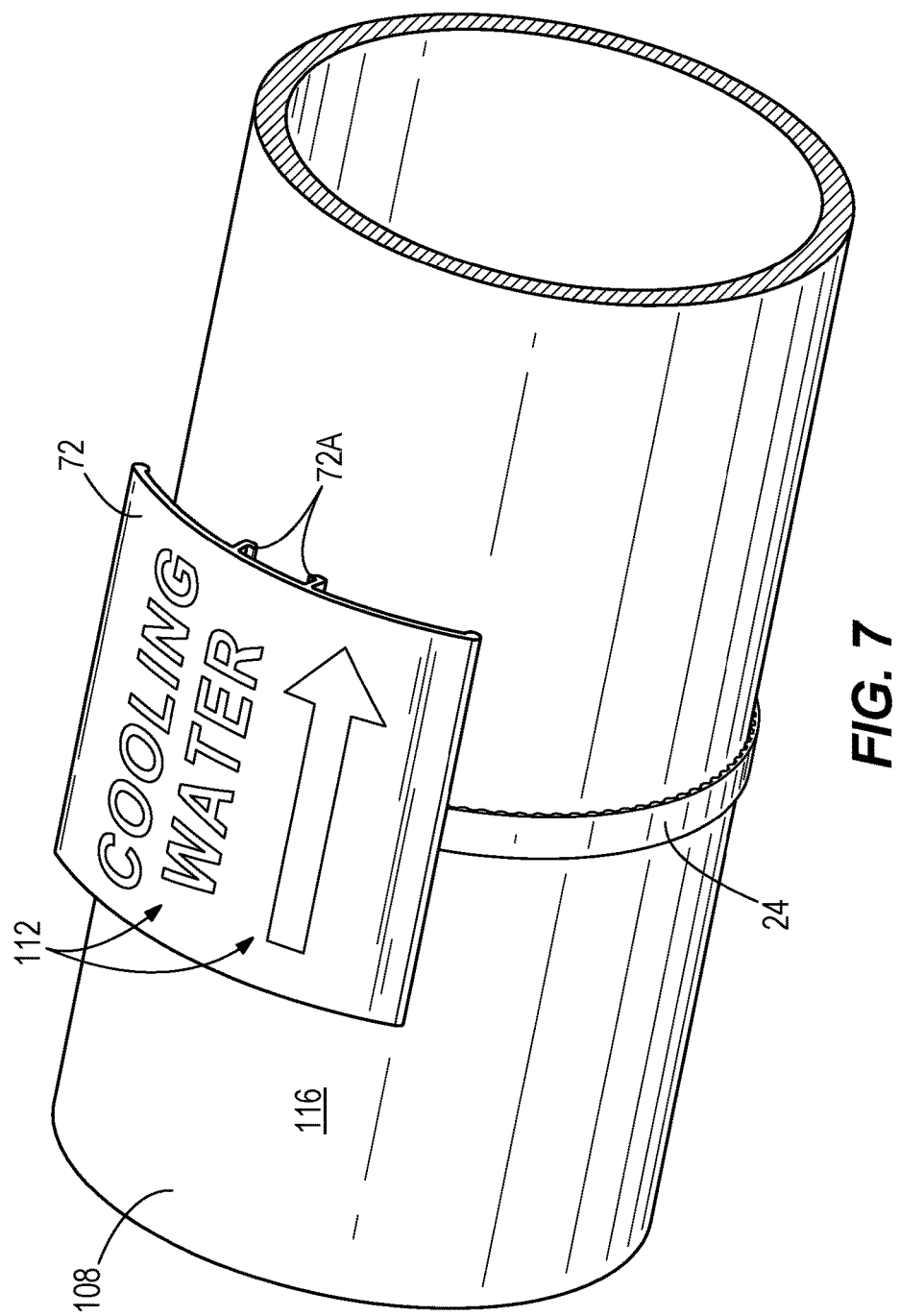
FIG. 7 is a perspective view of the fastening system, the pipe, and the carrier of FIG. 6.

FIGS. 6 and 7 illustrate the operation of the fastening system 20, according to one possible use. As shown, the strap 24 is wrapped around a pipe 108, and the ratchet head 28 supports a carrier 72 in latched engagement. The carrier 72 can carry identifying indicia 112, which may be provided directly on the carrier 72 (e.g., painted, molded, etched, etc.) or provided on a separate member such as a label, card, or decal affixed to the carrier 72. The indicia 112 may identify characteristics of the pipe 108, such as a type of fluid conveyed therein and/or a flow direction. The illustrated embodiment represents the indicia 112 as "COOLING WATER" with the addition of a directional arrow "→", but countless types of indicia may be appropriate across a wide variety of industrial and other uses. Of course, the fastening system 20 is also not limited to use with pipes as shown, but virtually any object or group of objects that can be encompassed by the strap 24.

With continued reference to FIGS. 6 and 7, it is noted that the strap 24 is engaged with both of the ratchet pawls 48, 56 to securely fasten the strap 24 about an outer surface 116 of the pipe 108 so that the side opposite the base surface 80 faces and contacts the outer surface 116. Although the strap 24 may contact the outer surface 116 about a majority or nearly all of the circumferential extent of the outer surface 116 except where the strap 24 is inside the ratchet head 28, the points of contact of the strap 24 with the outer surface 116 are limited, and continuous circumferential surface contact is avoided (i.e., continuous contact along the longitudinal direction of the strap 24). Due to the circumferentially discontinuous nature of the standoffs 92, the distal tips 92A of the standoffs 92 define the innermost points of the loop formed by the strap 24 and a continuous longitudinally-extending surface is avoided. In the case where the teeth 32 and the standoffs 92 have common heights $H_1$ and $H_2$ from the trough base surface 96 and the strap base surface 80, respectively, the strap 24 only contacts the outer surface 116 at the respective tooth and standoff tips 32A, 92A. In some constructions, the standoffs 92 extend further than the tooth tips 32A or the teeth 32 are oriented to the outside of the loop, and only the tips 92A of the standoffs 92 contact the outer surface 116. In addition, the troughs 88 establish channels of continuous non-contact along the entire longitudinal extent of the interface between the outer surface 116 and the strap 24. The spaces between adjacent standoffs 92 directly connect the channels to the outside atmosphere so that the interface between the strap 24 and the outer surface 116 is highly breathable and unlikely to trap liquid. This can be particularly beneficial in outdoor installations exposed to rainwater and/or sea water such as off-shore oil rigs, or any other facility where moisture is prevalent and pipes that require identifying indicia are subject to corrosion.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A fastening system comprising:
   a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
   a ratchet head having a ratchet pawl operable to engage the plurality of teeth to adjustably receive and secure the strap, wherein the ratchet head defines a concave bottom side.

2. The fastening system of claim 1, wherein the ratchet head includes at least one mount on a top side thereof.

3. The fastening system of claim 1, wherein the ratchet pawl is arranged in the ratchet head so that the plurality of teeth and the plurality of standoffs are arranged on the interior of a loop formed by the strap when engaged with the ratchet pawl of the ratchet head.

4. A fastening system comprising:
   a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
   a ratchet head having a ratchet pawl operable to engage the plurality of teeth to adjustably receive and secure the strap,
   wherein each of the troughs defines a trough base surface, and a plurality of roots are defined between adjacent pairs of the plurality of teeth, and wherein the plurality of roots and the trough base surfaces are at the same height with respect to the base surface defined by the first side of the strap.

5. A fastening system comprising:
   a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
   a ratchet head having a ratchet pawl operable to engage the plurality of teeth to adjustably receive and secure the strap,
   wherein a plurality of tooth tips are defined by the plurality of teeth and a plurality of standoff tips are defined by the plurality of standoffs, and wherein the plurality of tooth tips and the plurality of standoff tips are offset in the longitudinal direction.

6. A fastening system comprising:
a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending, from the base surface at least as far as a distal extent of the plurality of teeth, wherein each of the plurality of standoffs is defined by a segment of a cylinder; and
a ratchet head having a ratchet pawl operable to engage the plurality of teeth to adjustably receive and secure the strap.

7. A fastening system comprising:
a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth;
a ratchet head having a ratchet pawl operable to engage the plurality of teeth to adjustably receive and secure the strap, wherein the ratchet head includes at least one mount on a top side thereof; and
a carrier providing identifying indicia, wherein the carrier forms a latch member engageable with a latch member formed by the at least one mount of the ratchet head.

8. The fastening system of claim 7, wherein the at least one mount further includes a resilient spring tab dimensioned to be elastically deflected when the carrier is latched to the ratchet head.

9. A fastening system comprising:
a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
a ratchet head having a ratchet pawl operable to engage the plurality of teeth to adjustably receive and secure the strap, wherein the ratchet head includes, on a top side thereof, two opposed mounts, each of the two mounts including a latch member and a resilient spring tab.

10. A fastening system comprising:
a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
a ratchet head having a ratchet pawl operable to engage the plurality of teeth to adjustably receive and secure the strap, wherein the plurality of teeth are symmetrical so that the strap can be inserted into the first inlet opening and retained by the first ratchet pawl, regardless of whether a first longitudinal end or a second longitudinal end of the strap is inserted.

11. A fastening system comprising:
a strap including
   a first side defining a base surface,
   a second side opposite the first side having a plurality of teeth arranged along a longitudinal direction of the strap,
   a pair of opposed lateral side edges extending in the longitudinal direction,
   a pair of troughs, each of the pair of troughs extending in the longitudinal direction and positioned interstitially between the plurality of teeth and a respective one of the pair of opposed lateral side edges, and
   a plurality of standoffs are provided on the second side of the strap along each of the pair of opposed lateral side edges, the plurality of standoffs extending from the base surface at least as far as a distal extent of the plurality of teeth; and
a ratchet head having a ratchet pawl operable to engage the plurality of teeth to adjustably receive and secure the strap, wherein the ratchet head includes a first inlet opening provided in a first end and sized to receive the strap and the ratchet head further includes a second inlet opening provided in a second end opposite the first end and sized to receive the strap, wherein the ratchet pawl is a first ratchet pawl provided inward of the first inlet aperture, and a second ratchet pawl is provided inward of the second inlet opening.

12. The fastening system of claim 11, wherein the first inlet opening extends into the ratchet head and terminates therein at an end wall, forming a blind recess.

13. The fastening system of claim 12, wherein the second inlet opening extends through the ratchet head to an outlet opening on the first end of the ratchet head.

14. A fastening system comprising:
a strap including
a first side defining a base surface,
a second side opposite the first side having a plurality of teeth arranged along a longitudinal direction of the strap,
a pair of opposed lateral side edges extending in the longitudinal direction, and
a plurality of standoffs provided on the second side of the strap along each of the pair of opposed lateral side edges, the plurality of standoffs extending from the base surface at least as far as a distal extent of the plurality of teeth; and
a ratchet head including
a first inlet opening provided in a first end of the ratchet head and sized to receive the strap,
a second inlet opening provided in a second end of the ratchet head opposite the first end and sized to receive the strap,
a first ratchet pawl provided inward of the first inlet aperture, and
a second ratchet pawl is provided inward of the second inlet opening,
wherein the plurality of teeth and the plurality of standoffs are arranged on the interior of a loop formed by the strap when engaged with the first and second ratchet pawls of the ratchet head so that distal tips of the plurality of standoffs define the innermost points of the loop, and a continuous longitudinally-extending surface is avoided.

15. The fastening system of claim 14, wherein the ratchet head includes at least one mount on a top side thereof.

16. The fastening system of claim 15, further comprising a carrier providing identifying indicia, wherein the carrier forms a latch member engageable with a latch member formed by the at least one mount of the ratchet head.

17. The fastening system of claim 14, wherein the first and second ratchet pawls are arranged in the ratchet head so that the plurality of teeth and the plurality of standoffs are arranged on the interior of a loop formed by the strap when engaged with the first and second ratchet pawls of the ratchet head.

18. The fastening system of claim 14, wherein the first ratchet pawl is positioned along a blind recess extending into the ratchet head from the first inlet opening, and the second ratchet pawl is positioned along a passage that extends through the ratchet head between the second inlet opening and an outlet opening provided in the first end of the ratchet head.

19. The fastening system of claim 14, wherein the plurality of teeth are symmetrical so that the strap can be inserted into the first inlet opening and retained by the first ratchet pawl, regardless of whether a first longitudinal end or a second longitudinal end of the strap is inserted.

* * * * *